United States Patent [19]

Aoshima et al.

[11] Patent Number: 5,246,990
[45] Date of Patent: Sep. 21, 1993

[54] CURED ETHYLENE.α-OLEFIN COPOLYMER-BASED RUBBER COMPOSITION

[75] Inventors: Masashi Aoshima; Hironobu Shigematsu; Takeru Wadaki, all of Ibaraki, Japan

[73] Assignee: Sumitomo Chemical Company, Limited, Osaka, Japan

[21] Appl. No.: 793,104

[22] Filed: Nov. 15, 1991

[30] Foreign Application Priority Data

Nov. 22, 1990 [JP] Japan ................................. 2-320326

[51] Int. Cl.$^5$ ...................... C08K 5/3467; C08K 5/36; C08K 5/51; C08K 3/36
[52] U.S. Cl. ........................................ 524/91; 524/99; 524/153; 524/291; 524/303; 524/492
[58] Field of Search ................... 524/99, 102, 291, 92, 524/302, 303, 153, 91, 492

[56] References Cited

U.S. PATENT DOCUMENTS 4,704,425 11/1987 Lagarde et al. ...................... 524/492
4,889,881 12/1989 Takao et al. .......................... 524/91
5,081,170 1/1992 Yagi et al. ............................. 524/99

FOREIGN PATENT DOCUMENTS 61-36345 2/1986 Japan .
63-46246 2/1988 Japan .

Primary Examiner—Paul R. Michl
Assistant Examiner—Tae H. Yoon
Attorney, Agent, or Firm—Stevens, Davis, Miller & Mosher

[57] ABSTRACT

A cured ethylene·α-olefin copolymer-based rubber composition excellent in weathering resistance property is produced by curing with an organic peroxide an uncured rubber composition comprising 100 parts by weight of an ethylene ·α-olefin copolymer-based rubber, 1 to 10 parts by weight of a hindered amine-based weathering agent, 0.01 to 10 parts by weight of a phenol-based antioxidant, 0.01 to 10 parts by weight of a sulfur-based antioxidant, 0.01 to 10 parts by weight of a phosphite ester-based antioxidant, and 1 to 10 parts by weight of a benzotriazole-based ultraviolet absorber.

9 Claims, No Drawings

CURED ETHYLENE.α-OLEFIN COPOLYMER-BASED RUBBER COMPOSITION

BACKGROUND OF THE INVENTION

The present invention relates to a cured ethylene-α-olefin copolymer-based rubber composition and in particular to a cured ethylene-αcopolymer-based rubber composition excellent in weathering resistance property.

Cured ethylene -α-olefin copolymer-based rubbers are superior in weathering resistance property and heat resistance to natural rubbers and general-purpose rubbers such as styrene-butadiene rubber, butadiene rubber, and isoprene rubber and are widely used as automobile parts, industrial parts and electrical parts by making the best use of their characteristics.

Various researches have been so far made to improve properties of the cured ethylene-α-olefin copolymer-based rubbers.

For example, a cured ethylene-α-olefin copolymer-based rubber composition with an improved weathering resistance property, obtained by curing an uncured rubber composition comprising an ethylene-α-olefin copolymer-based rubber, a hindered amine-based weathering stabilizer, a phenol-based antioxidant and a benzotriazole-based ultraviolet absorber with an organic peroxide is proposed (JP-A-63-46246).

However, the weathering resistance property of the resulting cured rubber composition is improved only in the discoloration resistance and bending property, but improvement of tensile strength and elongation are not satisfactory. Improvements of the latter properties are now keenly desired.

SUMMARY OF THE INVENTION

An object of the present invention is to provide a cured ethylene-α-olefin copolymer-based rubber composition with an excellent weathering resistance property.

As a result of researches on development of cured ethylene α-olefin copolymer-based rubber compositions having an excellent weathering resistance property, the present inventors have found that the weathering resistance property can be markedly improved by mixing a specific antioxidant with a specific weathering stabilizer and a specific ultraviolet absorber. The present invention is based on this finding.

That is, the present invention provides a cured ethylene-α-olefin copolymer-based rubber composition, obtained by curing an uncured rubber composition comprising 100 parts by weight of an ethylene-α-olefin copolymer-based rubber, 1 to 10 parts by weight of a hindered amine-based weathering stabilizer, 0.01 to 10 parts by weight of a phenol-based antioxidant, 0.01 to 10 parts by weight of a sulfur-based antioxidant, 0.01 to 10 parts by weight of a phosphite ester-based antioxidant, and 1 to 10 parts by weight of a benzotriazole-based ultraviolet absorber.

DETAILED DESCRIPTION OF THE INVENTION

The ethylene-α-olefin copolymer-based rubbers in the present invention include ethylene-α-olefin copolymer-based rubbers and copolymer rubbers comprising ethylene-α-olefin and at least one of monomers having a non-conjugated double bond.

The α-olefin include, for example, propylene, 1-butene, 1-pentene and 1-hexene and the monomers having a non-conjugated double bond include, for example, ethylidenenorbornene, dicyclopentadiene, methylnorbornene, 4,7,8,9-tetrahydroindene and 1,4-hexadiene.

Such ethylene-α-olefin copolymer-based rubbers may be used alone or in combination with other natural rubbers or various synthetic rubbers, where the ethylene-α-olefin copolymer rubbers are a main component.

The hindered amine-based weathering stabilizers used in the present invention are 2,2,6,6-tetraalkylpiperidine derivatives having a molecular weight of 250 or more and having a substituent at the 4-position. Examples of the substituent at the 4-position are carboxylic acid residues, alkoxy groups, and alkylamino groups. Furthermore, the N-position may have an alkyl group, etc. as substituents. Examples of the weathering stabilizers are compounds represented by the following formulas (1)–(8):

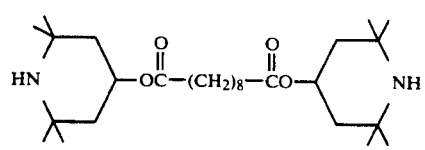

(1)

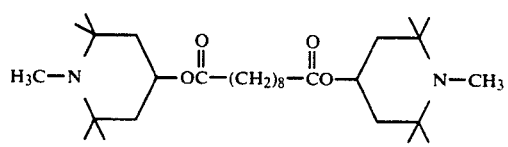

(2)

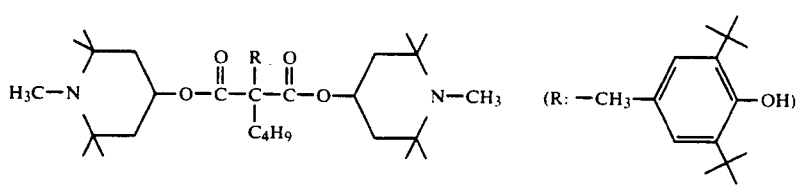

(3)

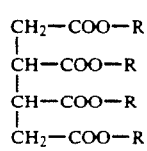 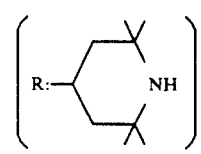 (4)
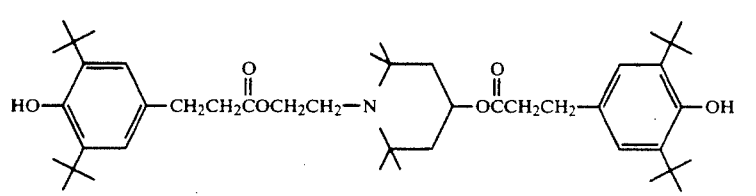 (5)
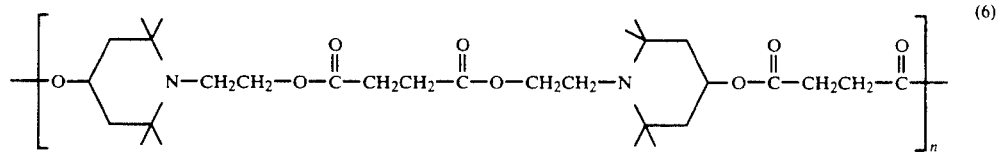 (6)
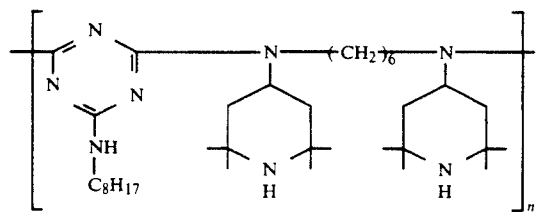 (7)
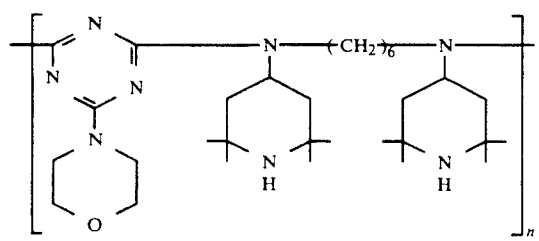 (8)
The phenol-based antioxidants used in the present invention are hindered phenol-based antioxidants such as 2,6-dialkylphenol derivatives and 2-alkylphenol derivatives, which can be exemplified by compounds of the following formulas (9–(16:
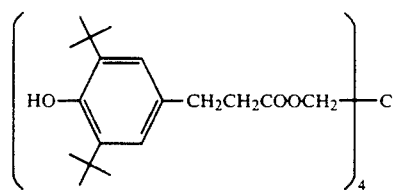 (11)
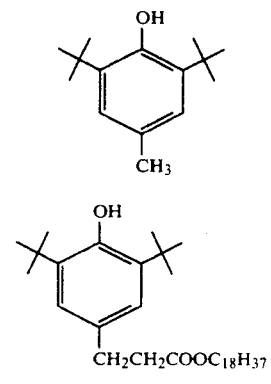
(9)
(10)
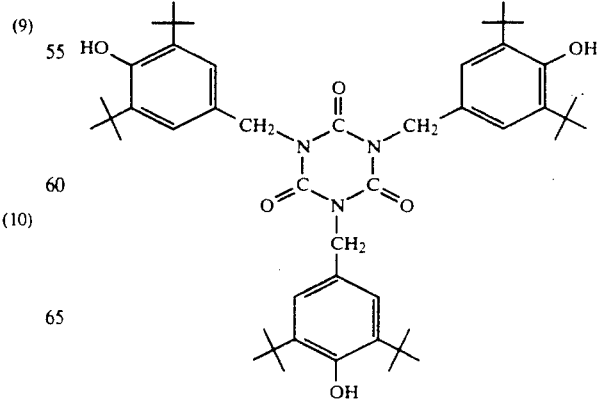 (12)

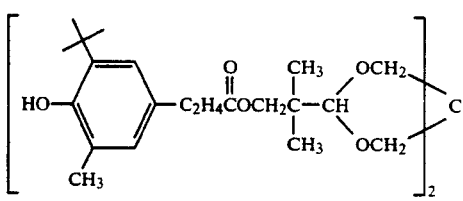 (13)

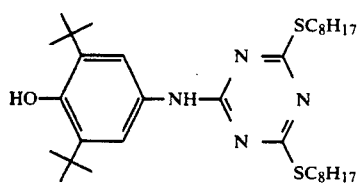 (14)

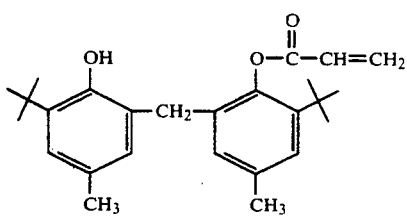 (15)

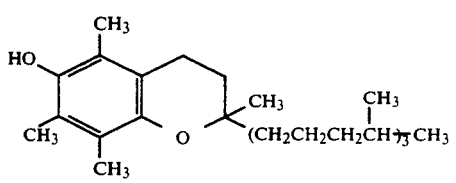 (16)

The sulfur-based antioxidants used in the present invention are sulfur-based compounds having a thiol bond or a thioether bond containing a divalent sulfur atom, which can be exemplified by compounds of the following formulas (17)–(24):

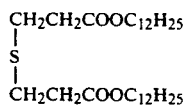 (17)

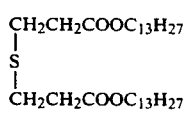 (18)

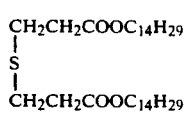 (19)

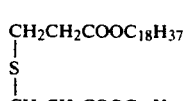 (20)

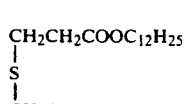 (21)

 (22)

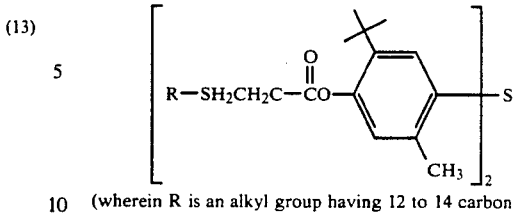 (23)

(wherein R is an alkyl group having 12 to 14 carbon atoms)

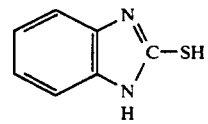 (24)

The phosphite ester-based antioxidants used in the present invention are phosphorus-based compounds having a phosphite ester bond containing a trivalent phosphorus atom, which can be exemplified by compounds of the following formulas (25)–(41):

 (25)

 (26)

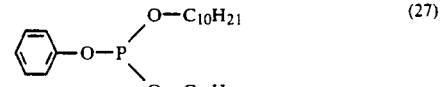 (27)

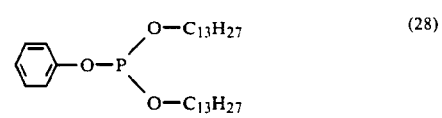 (28)

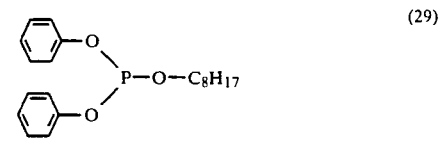 (29)

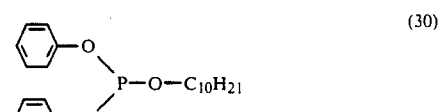 (30)

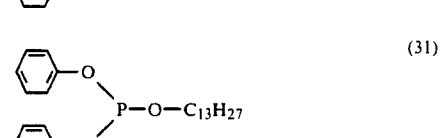 (31)

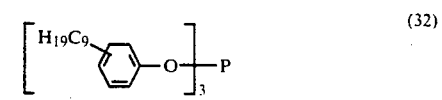 (32)

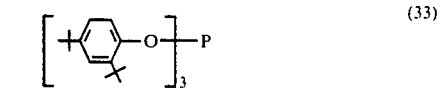 (33)

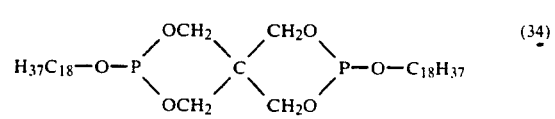 (34)

-continued

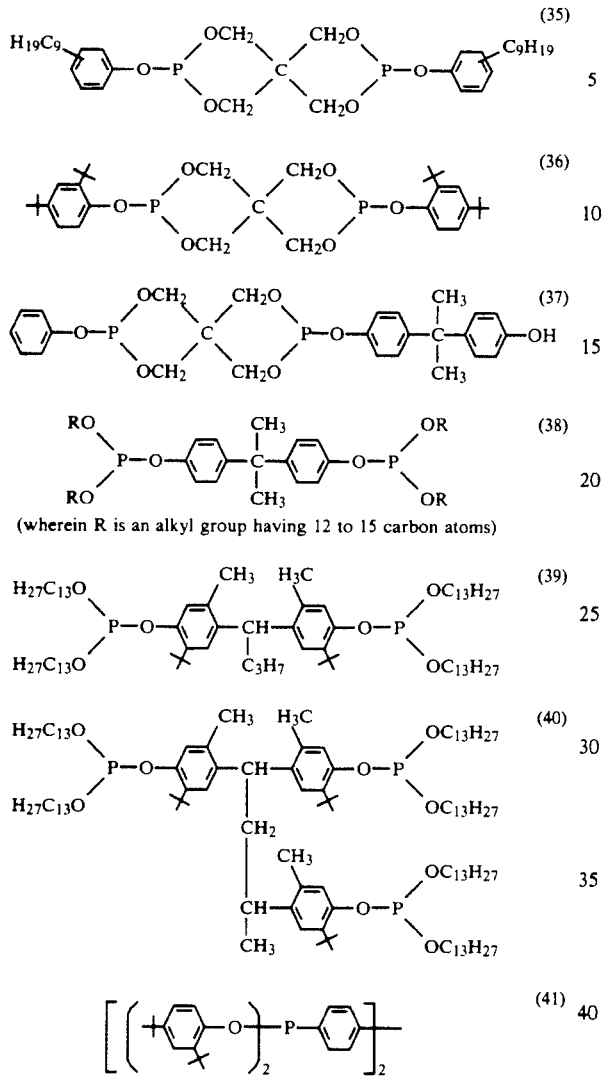

(wherein R is an alkyl group having 12 to 15 carbon atoms)

The benzotriazole-based ultraviolet absorbers used in the present invention are compounds having a 2-(2'-hydroxy-phenyl)benzotriazole skeleton, which can be exemplified by compounds of the following formulas (42)–(47):

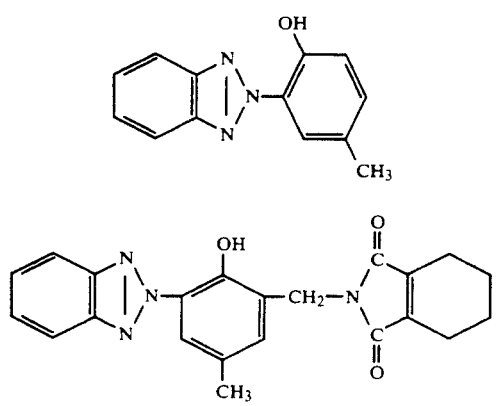

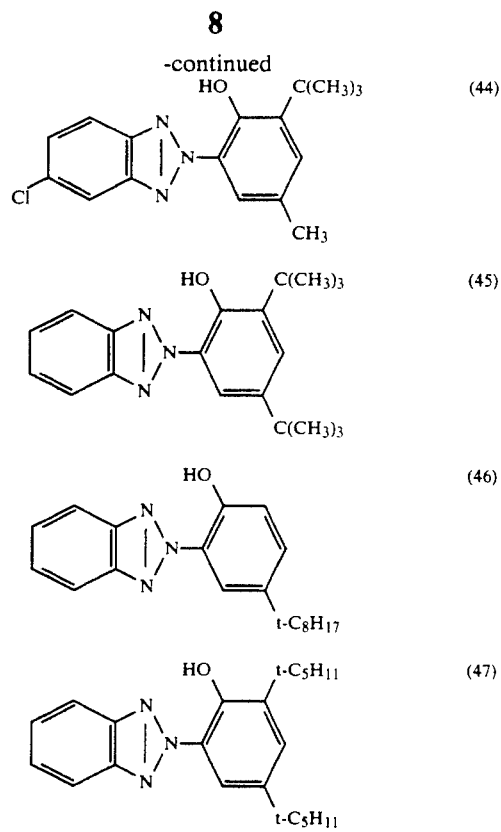

It is important in the present invention that all of the hindered amine-based weathering stabilizer, the phenol-based antioxidant, the sulfur-based antioxidant, the phosphite ester-based antioxidant and the benzotriazole-based ultraviolet absorber are used in combination and mixed with the ethylene-α-olefin copolymer-based rubber. When even one of them is omitted, the desired cured ethylene-α-olefin copolymer-based rubber composition having an excellent weathering resistance property can be no more obtained.

The hindered amine-based weathering stabilizer is used in an amount of usually 1 to 10 parts by weight, preferably 2 to 8 parts by weight on the basis of 100 parts by weight of the ethylene-α-olefin copolymer-based rubber. Below one part by weight, the desired effect on the weathering resistance property can be no more obtained, whereas above 10 parts by weight no more increase in the effect can be observed and also the weathering stabilizer may be bleeded to cause discoloration of the rubber.

The phenol-based antioxidant, the sulfur-based antioxidant and the phosphite ester-based antioxidant are used each in an amount of usually 0.01 to 10 parts by weight, preferably 0.5 to 4 parts by weight, on the basis of 100 parts by weight of the ethylene-α-olefin copolymer-based rubber. Below 0.01 part by weight, the desired effect on the weathering resistance property can be no more obtained, whereas above 10 parts by weight no more increase in the effect can be observed and also the antioxidants may be bleeded to cause discoloration of the rubber.

The benzotriazole-based ultraviolet absorber is used in an amount of usually 1 to 10 parts by weight, preferably 2 to 6 parts by weight, on the basis of 100 parts by weight of ethylene-α-olefin copolymer-based rubber. Below 1 part by weight, the desired effect on the weathering resistance property can be no more obtained, whereas above 10 parts by weight no more increase in the effect can be observed.

The rubber composition of the present invention can contain a reinforcing filler, when desired, to improve physical properties of cured rubber composition.

The reinforcing filler is used in an amount of usually 10 to 200 parts by weight, preferably 10 to 100 parts by weight, more preferably 20 to 40 parts by weight, on the basis of 100 parts by weight of the ethylene-α-olefin copolymer-based rubber, though its amount depends on a specific use.

The reinforcing fillers for use in the present invention include, for example, silica, clay, talc and calcium carbonate and especially preferred is anhydrous or hydrated silica having a BET surface area of 50 to 400 $m^2/g$.

The rubber composition of the present invention can further contain a softener such as process oil, a plasticizer, a softening agent such as stearic acid, as desired, though it depends on desired use.

Moreover, the rubber composition of the present invention can contain pigments and dyes such as Azo Lake, Quinacridone Red, Disazo Yellow, Phthalocyanine Blue, Ultramarine, and red iron oxide as a coloring agent.

In the present invention, it is necessary for improvement of weathering resistance property to conduct curing with an organic peroxide. Sulfur curing is unpreferable.

The organic peroxide used for this purpose is not particularly limited and can be those generally used for the curing of ethylene-α-olefin copolymer-based rubber, which includes, for example, dicumyl peroxide, benzoyl peroxide, 1,1-di-t-butylperoxy-3,3,5-trimethylcyclohexane, 2,5-dimethyl-2,5-di(t-butylperoxy)hexyne-3 and 1,3-di(t-butylperoxyisopropyl)benzene.

The organic peroxide is used usually in an amount of 1 to 8 parts by weight on the basis of 100 parts by weight of the ethylene-α-olefin copolymer-based rubber. It is also possible to add a co-crosslinking agent for the organic peroxide such as ethylene glycol dimethacrylate, trimethylpropane trimethacrylate, triallyl isocyanurate, and N,N'-m-phenylenebismaleimide.

Conditions for the curing with the organic peroxide are not particularly limited and the curing can be carried out, for example, at a curing temperature of 140° to 200° C. for 1 to 120 minutes.

The cured ethylene-α-olefin copolymer-based rubber compositions of the present invention are markedly excellent in weathering resistance property and can withstand prolonged outdoor use, and are most suited for uses such as waterproof sheets and color rubber parts for sport and leisure goods.

The present invention will be explained in detail below, referring Examples, and is not limited thereto.

For evaluation, preparation of test pieces, tensile tests and elongation tests were conducted in accordance with JIS K-6301 procedure.

Weathering test was conducted by subjecting a test piece to spraying for duration of 18 minutes during the 120-minute test run at a black panel temperature of 83° C., using SUNSHINE Weather-o-meter manufactured by Suga Tester Co. Japan and then making evaluation of the test piece after a given time.

EXAMPLES 1-7

All components shown in Table 1 except for dicumyl peroxide were kneaded in mixing ratios shown in Table 1 by 10-inch rolls at 120° C. for 5 minutes and then dicumyl peroxide was added thereto, followed by further kneading at 70° C. for 5 minutes. Each of the resulting compositions was press-cured at 160° C. for 60 minutes to make test pieces of cured rubber sheets having a thickness of 2 mm.

The test pieces were evaluated with respect to changes in the tensile strength and elongation before and after the weathering test with the SUNSHINE Weather-o-meter. The results are shown in Table 2.

COMPARATIVE EXAMPLES 1-5

Test pieces were prepared in mixing ratios from the components shown in Table 1 and evaluated in the same manner as in Examples 1-7. The results are shown in Table 2.

TABLE 1

| | Examples | | | | | | | Comparative Examples | | | | |
|---|---|---|---|---|---|---|---|---|---|---|---|---|
| | 1 | 2 | 3 | 4 | 5 | 6 | 7 | 1 | 2 | 3 | 4 | 5 |
| Ethylene-propylene-ethlidenenorbornene copolymar rubber *1) | 100 | 100 | 100 | 100 | 100 | 100 | 100 | 100 | 100 | 100 | 100 | 100 |
| Stearic acid | 1 | 1 | 1 | 1 | 1 | 1 | 1 | 1 | 1 | 1 | 1 | 1 |
| Anhydrous silica ② *2) | 20 | 20 | 20 | 20 | 20 | 20 | 20 | 20 | 20 | 20 | 20 | 20 |
| Benzotriazole-based ultraviolet absorber *3) | 2.0 | 2.0 | 2.0 | 2.0 | 2.0 | 2.0 | 2.0 | 2.0 | 2.0 | 2.0 | 2.0 | 2.0 |
| Hindered amine based weathering stabilizer ① *4) | 2.0 | — | — | — | — | 4.0 | 8.0 | 0.2 | 2.0 | 2.0 | 2.0 | — |
| Hindered amine based weathering stabilizer ② *5) | — | 2.0 | — | — | — | — | — | — | — | — | — | — |
| Hindered amine based weathering stabilizer ③ *6) | — | — | 2.0 | 2.0 | 2.0 | — | — | — | — | — | — | — |
| Phenol-based antioxidant ① *7) | 0.5 | 0.5 | 0.5 | — | 0.5 | 0.5 | 0.5 | 0.5 | 0.5 | — | — | 0.5 |
| Phenol-based antioxidant ② *8) | — | — | — | 2.0 | — | — | — | — | — | — | — | — |
| Sulfur-based antioxidant ① *9) | 0.5 | 0.5 | 0.5 | 0.5 | — | 0.5 | 0.5 | 0.5 | — | 0.5 | — | 0.5 |
| Sulfur-based antioxidant ② *10) | — | — | — | — | 2.0 | — | — | — | — | — | — | — |
| Phosphite ester-based antioxidant *11) | 0.5 | 0.5 | 0.5 | 0.5 | 0.5 | 0.5 | 0.5 | 0.5 | — | — | 0.5 | 0.5 |
| Dicumyl peroxide *12) | 2.0 | 2.0 | 2.0 | 2.0 | 2.0 | 2.0 | 2.0 | 2.0 | 2.0 | 2.0 | 2.0 | 2.0 |

*1) ESPRENE 524 manufactured by Sumitomo Chemical Co., Ltd.
(Mooney viscosity $ML_{1+4}$ 100° C.: 35, Ethylene content: 65% by weight, and Iodine value: 15)
*2) Finely powdered anhydrous silica manufactured by Japan Aerosil Co.
(BET surface area: 200 $m^2/g$, and primary particle size: 12 nm)
*3) SUMISORB 300 manufactured by Sumitomo Chemical Co., Ltd.

TABLE 1-continued

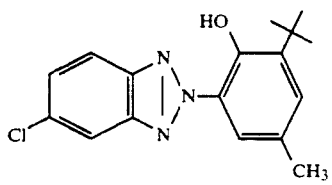

*4) TINUVIN 622 manufactured by Geigy Corp.

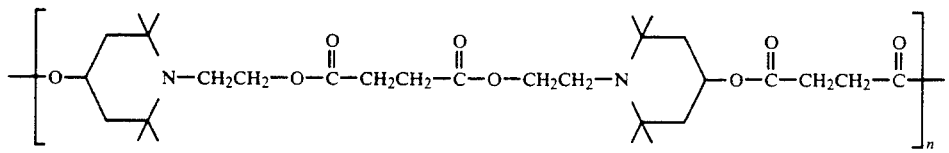

*5) CHIMASORB 944 manufactured by Ciba-Geigy Corp.

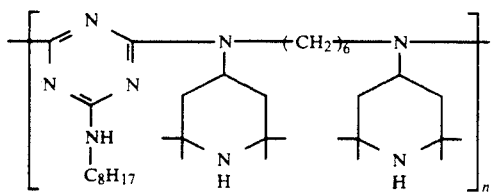

*6) SUMISORB 500 manufactured by Sumitomo Chemical Co., Ltd.

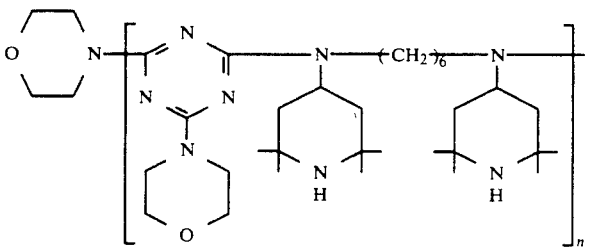

*7) SUMILIZER GA80 manufactured by Sumitomo Chemical Co., Ltd.

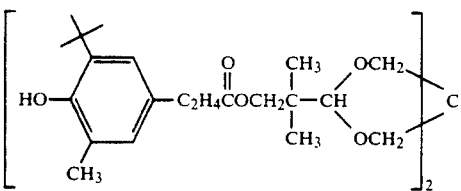

*8) SUMILIZER BP101 manufactured by Sumitomo Chemical Co., Ltd.

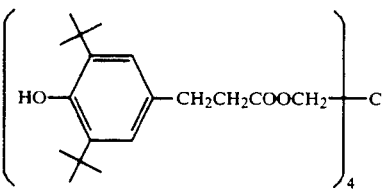

*9) SUMILIZER TP-D manufactured by Sumitomo Chemical Co., Ltd.

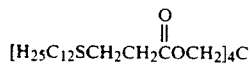

*10) SUMILIZER MB manufactured by Sumitomo Chemical Co., Ltd.

TABLE 1-continued

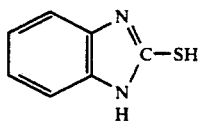

*11) SUMILIZER P-16 manufactured by Sumitomo Chemical Co., Ltd.

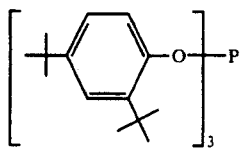

*12) Dicumyl peroxide manufactured by Sanken Kako Co.

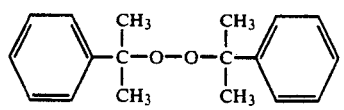

TABLE 2

| | | Results of evaluation on weathering resistance property | | | | | | | | | | |
|---|---|---|---|---|---|---|---|---|---|---|---|---|
| | | Examples | | | | | | | Comparative Examples | | | |
| | | 1 | 2 | 3 | 4 | 5 | 6 | 7 | 1 | 2 | 3 | 4 | 5 |
| Change in tensile strength (%) | 24 hr | +5 | +1 | −5 | −7 | −8 | −9 | −4 | −48 | −25 | −28 | −20 | −52 |
| | 48 hr | −8 | −10 | −13 | −15 | −20 | −21 | −11 | −65 | −44 | −48 | −31 | −65 |
| | 96 hr | −32 | −33 | −30 | −32 | −37 | −29 | −20 | −78 | −65 | −61 | −47 | −67 |
| Change in elongation (%) | 24 hr | −4 | −4 | −6 | −5 | −5 | −2 | −1 | −31 | −11 | −11 | −14 | −38 |
| | 48 hr | −8 | −8 | −10 | −11 | −9 | −6 | −5 | −45 | −28 | −21 | −22 | −59 |
| | 96 hr | −18 | −16 | −14 | −18 | −19 | −14 | −12 | −71 | −36 | −37 | −45 | −71 |

EXAMPLES 8-14

All components shown in Table 3 except for dicumyl peroxide were kneaded in mixing ratios shown in Table 3 by 10-inch rolls at 120° C. for 5 minutes and then dicumyl peroxide was added thereto, followed by further kneading at 70° C. for 5 minutes. Each of the resulting compositions was press-cured at 160° C. for 60 minutes to make test pieces of cured rubber sheets having a thickness of 2 mm.

The test pieces were evaluated with respect to changes in the tensile strength and elongation before and after the weathering tests with the SUNSHINE Weather-o-meter. The results are shown in Table 4.

COMPARATIVE EXAMPLES 6-10

Test pieces were prepared in mixing ratios from the components shown in Table 3 and evaluated in the same manner as in Examples 8-14. The results are shown in Table 4.

TABLE 3

| | Examples | | | | | | | Comparative Examples | | | | |
|---|---|---|---|---|---|---|---|---|---|---|---|---|
| | 8 | 9 | 10 | 11 | 12 | 13 | 14 | 6 | 7 | 8 | 9 | 10 |
| Ethylene-propylene-ethlidenenorbornene copolymar rubber *13) | 100 | 100 | 100 | 100 | 100 | 100 | 100 | 100 | 100 | 100 | 100 | 100 |
| Stearic acid | 1 | 1 | 1 | 1 | 1 | 1 | 1 | 1 | 1 | 1 | 1 | 1 |
| Anhydrous silica ① *14) | — | — | — | — | 20 | — | — | — | — | — | — | — |
| Anhydrous silica ② *15) | 10 | 10 | — | — | — | — | 20 | 10 | 10 | — | — | 5 |
| Anhydrous silica ③ *16) | — | — | — | — | — | 20 | — | — | — | — | — | — |
| Titanium dioxide *17) | 50 | — | 50 | — | — | — | — | 50 | — | 50 | — | — |
| Magnesium silicate *18) | — | 50 | — | 50 | — | — | — | — | 50 | — | 50 | — |
| Benzotriazole-based ultraviolet absorber *19) | 2.0 | 2.0 | 2.0 | 2.0 | 2.0 | 2.0 | 2.0 | 2.0 | 2.0 | 2.0 | 2.0 | 2.0 |
| Hindered amine based weathering stabilizer ③ *20) | 2.0 | 2.0 | 2.0 | 2.0 | 2.0 | 2.0 | 2.0 | 0.2 | 0.2 | 0.2 | 0.2 | 0.2 |
| Phenol-based antioxidant ① *21) | 0.5 | 0.5 | 0.5 | 0.5 | 0.5 | 0.5 | 0.5 | 0.5 | 0.5 | 0.5 | 0.5 | 0.5 |
| Sulfur-based antioxidant ① *22) | 0.5 | 0.5 | 0.5 | 0.5 | 0.5 | 0.5 | 0.5 | 0.5 | 0.5 | 0.5 | 0.5 | 0.5 |
| Phosphite ester-based antioxidant *23) | 0.5 | 0.5 | 0.5 | 0.5 | 0.5 | 0.5 | 0.5 | 0.5 | 0.5 | 0.5 | 0.5 | 0.5 |
| Dicumyl peroxide *24) | 2.0 | 2.0 | 2.0 | 2.0 | 2.0 | 2.0 | 2.0 | 2.0 | 2.0 | 2.0 | 2.0 | 2.0 |

*13) ESPRENE 524 manufactured by Sumitomo Chemical Co., Ltd.
(Mooney viscosity $ML_{1+4}$ 100° C.: 35, Ethylene content: 65% by weight, and Iodine value: 15)
*14) Finely powdered anhydrous silica manufactured by Japan Aerosil Co.
(BET surface area: 130 m$^2$/g, and primary particle size: 16 nm)
*15) Finely powdered anhydrous silica manufactured by Japan Aerosil Co.
(BET surface area: 200 m$^2$/g, and primary particle size: 12 nm)
*16) Finely powdered anhydrous silica manufactured by Japan Aerosil Co.

TABLE 3-continued (BET surface area: 300 m²/g, and primary particle size: 7 nm)
*17) Finely powdered titanium dioxide (rutile type) maufactured by Ishihara Sangyo Co., Ltd.
*18) Finely powdered magnesium silicate manufactured by Japan Mistron Co.
*19) SUMISORB 300 manufactured by Sumitomo Chemical Co., Ltd.

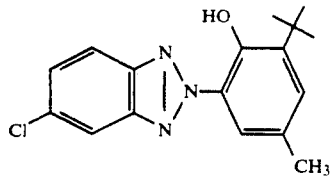

*20) SUMISORB 500 manufactured by Sumitomo Chemical Co., Ltd.

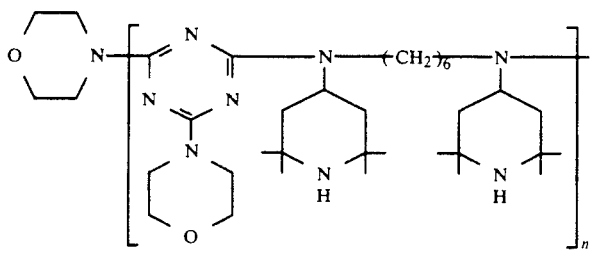

*21) SUMILIZER GA80 manufactured by Sumitomo Chemical Co., Ltd.

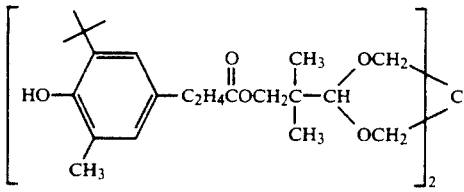

*22) SUMILIZER TP-D manufactured by Sumitomo Chemical Co., Ltd.

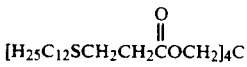

*23) SUMILIZER P-16 manufactured by Sumitomo Chemical Co., Ltd.

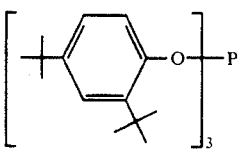

*24) Dicumyl peroxide manufactured by Sanken Kako Co.

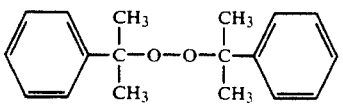

TABLE 4

| | | Results of evaluation on weathering resistance property | | | | | | | | | | |
|---|---|---|---|---|---|---|---|---|---|---|---|---|
| | | Examples | | | | | | Comparative Examples | | | | |
| | | 8 | 9 | 10 | 11 | 12 | 13 | 14 | 6 | 7 | 8 | 9 | 10 |
| Change in | 24 hr | 18 | −15 | −6 | −5 | −2 | −6 | −5 | −25 | −24 | −22 | −27 | −47 |
| tensile | 48 hr | −24 | −26 | −7 | −5 | −11 | −13 | −13 | −56 | −41 | −39 | −41 | −67 |
| strength (%) | 96 hr | −45 | −38 | −16 | −25 | −24 | −23 | −30 | −71 | −64 | −68 | −58 | −70 |
| Change in | 24 hr | −8 | −4 | −1 | 0 | 0 | −5 | −6 | −10 | −8 | −7 | −11 | −13 |
| elongation | 48 hr | −8 | −6 | −3 | −1 | −3 | −9 | −10 | −31 | −27 | −25 | −23 | −34 |
| (%) | 96 hr | −28 | −13 | −3 | −6 | −9 | −12 | −14 | −58 | −47 | −48 | −40 | −50 |

What is claimed is:

1. A cured ethylene-α-olefin copolymer-based rubber composition obtained by curing with an organic peroxide an uncured rubber composition consisting [essentially] of 100 parts by weight of an ethylene-α-olefin copolymer-based rubber, 2 to 8 parts by weight of a hindered amine-based weathering stabilizer, 0.5 to 4 parts by weight of a phenol-based antioxidant, 0.5 to 4 parts by weight of a sulfur-based antioxidant, 0.5 to 4 parts by weight of a phosphite ester-based antioxidant, 2 to 6 parts by weight of a benzotriazole-based ultraviolet absorber, and silica.

2. A cured ethylene-α-olefin copolymer-based rubber composition according to claim 1, wherein the ethylene-α-olefin copolymer-based rubber is an ethylene-α-olefin copolymer rubber or a copolymer rubber comprising ethylene-α-olefin and at least one of monomers containing a non-conjugated double bond.

3. A cured ethylene-α-olefin copolymer-based rubber composition according to claim 1, wherein the hindered amine-based, weathering stabilizer is a 2,2,6,6-tetraalkylpiperidine derivative having a substituent at the 4-position and having a molecular weight of at least 250.

4. A cured ethylene-α-olefin copolymer based rubber composition according to claim 1, wherein the phenol-based antioxidant is a hindered phenol-based antioxidant.

5. A cured ethylene-α-olefin copolymer-based rubber composition according to claim 1, wherein the sulfur-based antioxidant is a compound having a thiol or thioether bond containing a divalent sulfur atom.

6. A cured ethylene-α-olefin copolymer-based rubber composition according to claim 1, wherein the phosphite ester-based antioxidant is a phosphorus compound having a phosphite ester bond containing a trivalent phosphorus atom.

7. A cured ethylene-α-olefin copolymer-based rubber composition according to claim 1, wherein the benzotriazole-based ultraviolet absorber is a compound having a 2-(2'-hydroxy-phenyl)benzotriazole skeleton.

8. A cured ethylene-α-olefin copolymer-based rubber composition according to claim 1, wherein the silica has a BET surface area of 130 to 300 $m^2/g$.

9. A cured ethylene-α-olefin copolymer-based rubber composition according to claim 1, wherein amount of silica is 10 to 200 parts by weight based on 100 parts by weight of the ethylene-α-olefin-based rubber.

* * * * *